Patented Oct. 23, 1945

2,387,495

UNITED STATES PATENT OFFICE 2,387,495

PRODUCTS AND PROCESS THEREFOR

Donald Drake Coffman, Lindamere, Del., assignor to E. I. du Pont de Nemours & Company, Wilmington, Del., a corporation of Delaware No Drawing. Application December 12, 1942, Serial No. 468,810

5 Claims. (Cl. 260—484)

This invention relates to acetals of hydroxyacetic acid esters and their preparation.

This invention has as an object the provision of a process for the preparation of acetals of hydroxyacetic acid esters. Another object is the class of acetal esters thus prepared. Other objects will appear hereinafter.

These objects are accomplished in the following invention wherein acetylene is reacted with an hydroxyacetic acid ester at atmospheric or elevated pressures and at a temperature of 20°–150° C. in the presence of a mercury catalyst to form bis(hydroxyacetic acid ester) acetals.

A convenient method of accomplishing the acetalization comprises reacting an hydroxyacetic acid ester with acetylene under atmospheric pressure or above at 25 to 50° C., employing as catalyst a suspension of mercuric oxide in boron trifluoride-methanol complex under substantially anhydrous conditions. The reaction is stopped when the theoretical amount of acetylene has been absorbed. After removing the solid matter and the acidic catalyst by filtration and alkaline washes, respectively, the pure acetal can be isolated from the dried reaction product by fractional distillation at reduced pressure.

As an alternative method, the bis(hydroxyacetic acid ester) acetals may be obtained by carrying out the reaction of acetylene with an hydroxyacetic acid ester at 150–250 lbs./sq. in. pressure, and at 70–110° C., in the presence of a mercuric phosphate catalyst. After the reaction is complete, the product may be isolated from the reaction mixture by filtering off the catalyst and fractional distillation of the filtrate at reduced pressure.

The more detailed practice of the invention is illustrated by the following examples, wherein parts given are by weight. There are of course many forms of the invention other than these specific embodiments.

Example I

In a reaction vessel fitted with a sealed stirrer, a gas inlet tube extending to within two inches of the liquid surface, and a thermometer were placed 528 parts of isobutyl hydroxyacetate and a mixture consisting of two parts of mercuric oxide partially dissolved in ten parts of boron trifluoride-methanol complex (a 1:1 mol ratio of boron trifluoride to methanol). While the temperature of reaction was maintained at 25–35° C., acetylene was passed over the well-stirred reaction mixture until an increase in weight of 52 parts was obtained. After cooling to 10° C., twenty parts of sodium carbonate was added to the reaction mixture. The mixture was stirred for ten minutes and fifty parts of a saturated aqueous sodium carbonate solution and 300 parts of diethyl ether were then added. After stirring for an additional ten minutes, the mixture was filtered. After removal from the aqueous layer, the ethereal solution was dried over anhydrous potassium carbonate. The ether was removed by distillation, and on fractional distillation of the residue, 400 parts of a 70% yield of bis(isobutyl hydroxyacetate) acetal was obtained distilling at 128 to 135° C./2 mm. A pure sample distilling at 130 to 131° C./2 mm. analyzed 9.10% H and 57.73% C, the calculated values being 8.97% and 57.86%, respectively. The density at 25° C. was 1.0204 and the index of refraction $n_D^{25}$ was 1.4308. The molecular refraction was 73.5, the calculated value being 73.32.

Example II

Employing the same apparatus as described in Example I, a mixture of three parts of mercuric oxide, fifteen parts of boron trifluoride-methanol complex, and 540 parts of methyl hydroxyacetate was reacted with 68 parts of acetylene at 25–35° C. The reaction mixture was treated in the manner described in Example I. After distilling the ether from the dried ethereal solution, 308 parts or an 81% yield, based on acetylene absorption, of bis(methyl hydroxyacetate) acetal distilling at 115 to 120° C./2 to 3 mm. was obtained. A pure sample distilling at 114 to 117° C./2 to 3 mm. analyzed 6.74% H and 46.72% C, the calculated values being 6.80% and 46.55%, respectively. The molecular refraction was 45.72, the calculated value being 45.74. The density at 25° C. was 1.1652 and the refractive index $n_D^{25}$ was 1.4308.

The yield of acetal falls off markedly when the temperature of the reaction exceeds 60° C. Thus, in conducting the reaction under the conditions set forth in Example II above but with the temperature maintained at 60–70° C., the yield was only 30%. Apparently at temperatures above 60° C., considerable self-condensation of methyl hydroxyacetate occurs and a non-distillable polymeric product is formed.

Example III

In a stainless steel pressure bomb capable of being rocked, there were placed 500 parts of methyl hydroxyacetate and 50 parts of mercuric phosphate. The bomb was sealed, flushed twice with nitrogen, pressured with acetylene at 250 lbs./sq. in., heated to 70° C. and the reaction started by rocking the bomb. The acetylene absorption was rapid, requiring frequent repressuring of the bomb. In 1½ hours a pressure drop corresponding to 1350 lbs./sq. in. of acetylene occurred. When acetylene absorption ceased, the mixture was filtered and the product fractionally distilled. In this manner 320 parts or a 56% yield of bis(methyl hydroxyacetate)acetal was obtained.

*Example IV*

When 700 parts of isobutyl hydroxyacetate and 70 parts of mercuric phosphate were reacted with acetylene at 250 lbs./sq. in. pressure and 110° C., as in Example III, and the reaction product filtered and fractionally distilled at reduced pressure there was obtained 425 parts or a 56% yield of bis(isobutyl hydroxyacetate) acetal.

In place of the methyl and isobutyl hydroxyacetates of the above examples there may be employed any other monohydric alcohol hydroxyacetate including ethyl, propyl, butyl, dodecyl, phenyl, cyclohexyl, benzyl, allyl, methallyl, 2-acetoxyethyl, and tetrahydrofurfuryl hydroxyacetates. The hydroxyacetates of the alkanols and particularly the lower alkanols (one to seven carbon atoms) are preferred.

While mercuric oxide with boron trifluoride-methanol complex is most convenient there may be employed with a boron trifluoride complex any mercuric salt of an acid weaker than the boron trifluoride-methanol complex, i. e. having a dissociation constant less than $1 \times 10^{-3}$, including mercuric carbonate, mercuric oxalate, mercuric acetate, and mercuric benzoate. Other complexes which are operable are those of boron trifluoride with ethers, higher homologs of methanol, acetic acid, and water. In the absence of a boron trifluoride complex, mercuric salts of stronger acids such as mercuric phosphate and mercuric sulfate can be employed but the use of somewhat higher reaction temperatures and acetylene pressures are required to accomplish acetal formation in a conveniently short time.

With boron trifluoride complex and mercuric salts as catalysts the temperatures of reaction may vary from 20–60° C., although the preferable range is 25 to 50° C. At temperatures below 25° C., the rate of reaction becomes exceedingly slow, whereas at temperatures above 50° C. the speed of competing secondary reactions, such as self-condensation of hydroxyacetic acid ester becomes rapid enough to decrease markedly the yield of monomeric acetal. Pressures above atmospheric pressure may be employed to increase the rate of reaction, but at the same time rigorous temperature control must be maintained to prevent excessive temperature rises since the reaction is markedly exothermic.

When mercuric phosphate or sulfate is employed in the absence of a boron trifluoride complex, pressures from 50 lbs. to 500 lbs./sq. in. may be employed, although the preferred range is 200 to 300 lbs./sq. in. with temperatures ranging from 30 to 150° C. but preferably from 70–110° C. At pressures below 200 lbs. the rate of reaction becomes slower whereas the advantage of increased rate of reaction at pressures above 300 lbs./sq. in. is offset by the hazards involved in employing acetylene at high pressures.

The products of this invention have the following formula $$CH_3C=(OCH_2\overset{O}{\overset{\|}{C}}-OR)_2$$

wherein R is aliphatic, including cycloaliphatic, aromatic or heterocyclic, saturated or unsaturated, substituted or unsubstituted. They range from oily liquids to low melting waxy solids. Hydrolysis with dilute (e. g. 5%) mineral acid (hydrochloric or sulfuric), e. g. by refluxing one hour, yields acetaldehyde, hydroxyacetic acid and the complementary compound, ROH, the R having the significance above given.

The acetals of hydroxyacetic acid esters can also be pyrolyzed, e. g. by passing them through a tube containing a catalyst, e. g. silver on asbestos, heated at 250 to 350° C. to obtain the vinyl ether of hydroxyacetic acid ester and the hydroxyacetic acid ester.

The acetals of the invention are particularly useful as intermediates in the preparation, by pyrolysis, of vinyl ethers of hydroxyacetic acid esters. The acetals derived from hydroxy acetic acid esters of the higher (six to twelve carbon) alcohols, e. g. hexyl, octyl, 2-ethylhexyl, and dodecyl alcohols, are useful as plasticizers for cellulose acetate, cellulose nitrate, acetals of polyvinyl alcohol, polymethyl methacrylate, polyvinyl acetate, and other common plastics. They may also be used as petroleum adjuvants. The acetals of hydroxyacetic acid esters of the lower (one to five carbon) alcohols, e. g. methyl, ethyl, propyl, isopropyl, butyl, isobutyl, sec-butyl, and amyl alcohols, are useful as high boiling solvents. The acetals may also be used as brake fluids and for the insolubilization of polyvinyl alcohol plastics.

The above description and examples are intended to be illustrative only. Any modification of or variation therefrom which conforms to the spirit of the invention is intended to be included within the scope of the claims.

What is claimed is:

1. A process for the preparation of acetals which comprises reacting acetylene with a monohydric alcohol ester of hydroxyacetic acid at 20–150° C. under anhydrous conditions in the presence of a mercury catalyst.

2. A process for the preparation of acetals which comprises reacting acetylene with a monohydric alcohol ester of hydroxyacetic acid at 20–150° C. under anhydrous conditions in the presence of a boron trifluoride-mercury catalyst.

3. A process for the preparation of acetals which comprises reacting acetylene with an alkyl ester of hydroxyacetic acid at 20–150° C. under anhydrous conditions in the presence of a boron trifluoride-mercury catalyst.

4. A process for the preparation of acetals which comprises reacting acetylene with a lower alkyl ester of hydroxyacetic acid at 20–60° C. under anhydrous conditions in the presence of a boron trifluoride-mercury catalyst.

5. A process for the preparation of acetals which comprises reacting acetylene with methyl hydroxyacetate at 20–60° C. under anhydrous conditions in the presence of a boron trifluoride-mercury catalyst.

DONALD DRAKE COFFMAN.